(12) United States Patent
Matsumoto et al.

(10) Patent No.: US 7,137,298 B2
(45) Date of Patent: Nov. 21, 2006

(54) THERMAL AIR FLOWMETER

(75) Inventors: Masahiro Matsumoto, Hitachi (JP);
Masamichi Yamada, Hitachinaka (JP);
Izumi Watanabe, Hitachinaka (JP);
Keiji Hanzawa, Mito (JP); Keiichi Nakada, Hitachinaka (JP)

(73) Assignees: Hitachi, Ltd., Tokyo (JP); Hitachi Car Engineering Co. Ltd., Tokyo (JP)

( * ) Notice: Subject to any disclaimer, the term of this patent is extended or adjusted under 35 U.S.C. 154(b) by 0 days.

(21) Appl. No.: 10/860,326

(22) Filed: Jun. 4, 2004

(65) Prior Publication Data

US 2004/0244479 A1 Dec. 9, 2004

(30) Foreign Application Priority Data

Jun. 5, 2003 (JP) ............................ 2003-160704

(51) Int. Cl.
*G01F 1/68* (2006.01)
(52) U.S. Cl. ................................................. 73/204.26
(58) Field of Classification Search ............ 73/204.26, 73/118.2
See application file for complete search history.

(56) References Cited

U.S. PATENT DOCUMENTS

| 4,761,995 | A | * | 8/1988 | Ohta et al. ............... 73/204.17 |
| 4,833,912 | A | * | 5/1989 | Ohta et al. ................. 73/118.2 |
| 6,550,325 | B1 | * | 4/2003 | Inushima et al. ........ 73/204.26 |
| 6,579,612 | B1 | * | 6/2003 | Lille .......................... 428/332 |
| 6,615,655 | B1 | * | 9/2003 | Sakai et al. .............. 73/204.26 |

FOREIGN PATENT DOCUMENTS

| JP | 2002-202168 | 7/2002 |
| JP | 3366818 | 11/2002 |

* cited by examiner

*Primary Examiner*—Jewel Thompson
(74) *Attorney, Agent, or Firm*—Mattingly, Stanger, Malur & Brundidge, P.C.

(57) ABSTRACT

A thermal air flowmeter which improves air flow rate measurement sensitivity, reduces power consumption of a heating element and broadens the measuring range. A heating resistor is provided on insulating film in a thermal insulating area as a rectangular space on a flat substrate; and two resistance temperature detectors are provided upstream and downstream of the heating resistor. The sides of the rectangular thermal insulating area which are parallel to the axis of air flow are longer than its sides which are perpendicular to the axis of air flow.

9 Claims, 13 Drawing Sheets

Long-to-Short Side Ratio L/W

Air Flow →

THERMAL AIR FLOWMETER

FIELD OF THE INVENTION

The present invention relates to a thermal air flowmeter which measures the intake air flow rate in an internal combustion engine according to the difference between the upstream and downstream temperatures of a heating element to be controlled.

BACKGROUND OF THE INVENTION

[Patent document 1] JP-A No.202168/2002

[Patent document 2] Japanese Patent No. 3366818

Generally known air flowmeters which measure the intake air flow rate in an internal combustion engine of a car or the like include: an air flowmeter which measures the intake air flow rate according to heat radiation of a heating element (heating resistor) to be controlled; and a thermal air flowmeter which measures the flow rate according to the difference between the upstream and downstream temperatures of a heating element. The latter is called a temperature difference type thermal air flowmeter.

In a temperature difference type thermal air flowmeter, electrical insulating film (supporting film) is laid over the surface (top face) of a flat substrate (semiconductor substrate like a silicon substrate) and a heating element (heating resistor) is provided on this insulating film and temperature detectors (resistance temperature detectors, thermocouples, etc) are provided on both sides (air flow upstream and downstream) of the heating element. The flat substrate is coated with protective film in a way that the heating element and temperature detectors are covered.

For the purpose of thermal insulation from the heating element, a cavity is made in the flat substrate by edging to create a thermal insulating space. In the prior art, this thermal insulating space is almost square as described in the above patent documents 1 and 2.

In the prior art, the thermal insulating area on the flat substrate is almost square. The thermal insulator of the thermal insulating area on the flat substrate consists of thin electrical insulating film (diaphragm) with a thickness of several micrometers. Because the thermal insulating area is almost square, in consideration of strength, the size (square measure) of the thermal insulator is limited. If the air contains particles of dust, the particles will collide the thermal insulator and destroy the thin film (several micrometers in thickness). Since the size of the thermal insulating area is limited, it is impossible to improve the air flow rate measurement sensitivity, reduce power consumption of the heating element and broaden the measuring range.

SUMMARY OF THE INVENTION

An object of the present invention is to provide a thermal air flowmeter which improves the air flow rate measurement sensitivity, reduces power consumption of a heating element and broadens the measuring range.

According to one aspect of the present invention, a heating element is provided on insulating film of a thermal insulating area as a rectangular space provided on a flat substrate and two temperature detectors are provided upstream and downstream of the heating element; and the sides of the rectangular thermal insulating area which are parallel to the axis of air flow are greater than its sides which are perpendicular to the axis of air flow.

In other words, in the present invention, a rectangular thermal insulating area is provided along the axis of air flow on a flat substrate and a heating element and two temperature detectors are provided on the insulating film in the rectangular thermal insulating area.

According to another aspect of the invention, for a desirable thermal insulating area, its sides which are parallel to the axis of air flow are at least 1.5 times longer than its perpendicular sides.

In the present invention, the sides of the thermal insulating area which are parallel to the axis of air flow are longer than its perpendicular sides and the distance between the heating element and the sides of the thermal insulating area which are perpendicular to the axis of air flow can be increased so that the flow rate measurement sensitivity can be improved. In addition, the length of the heating element, which is perpendicular to the axis of air flow, can be decreased to reduce power consumption and also the width of the heating element, which is parallel to the axis of air flow, can be increased to broaden the measuring range.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, preferred embodiments of the present invention will be described referring to the accompanying drawings.

Figure 1:
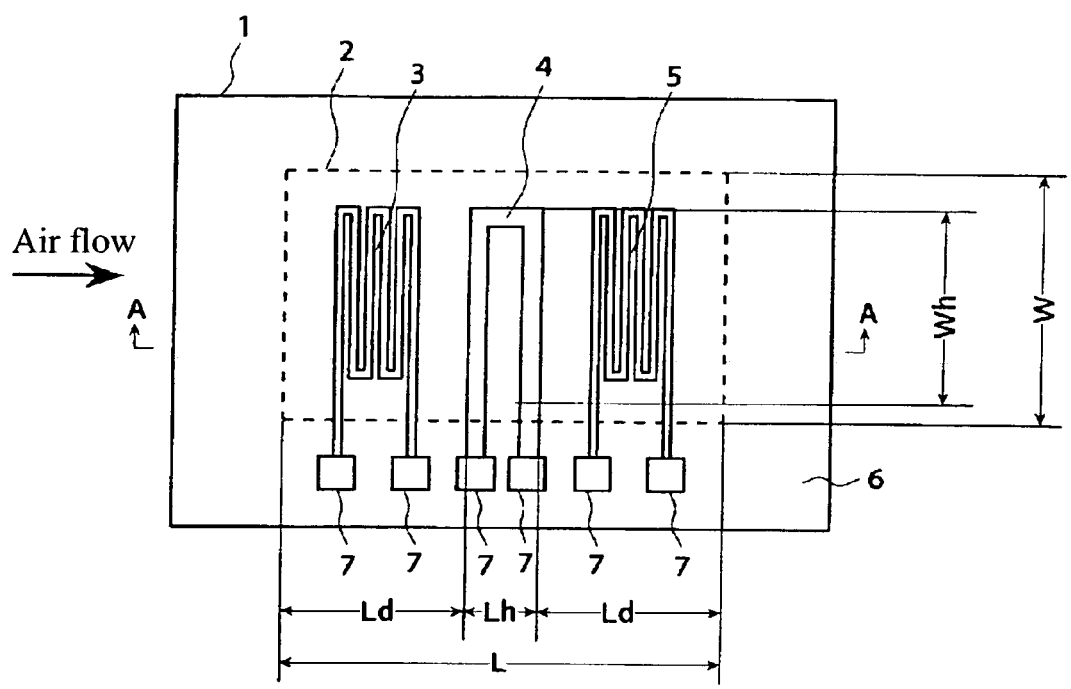
FIG. 1 is a top view showing a first embodiment of the present invention.
Figure 2:
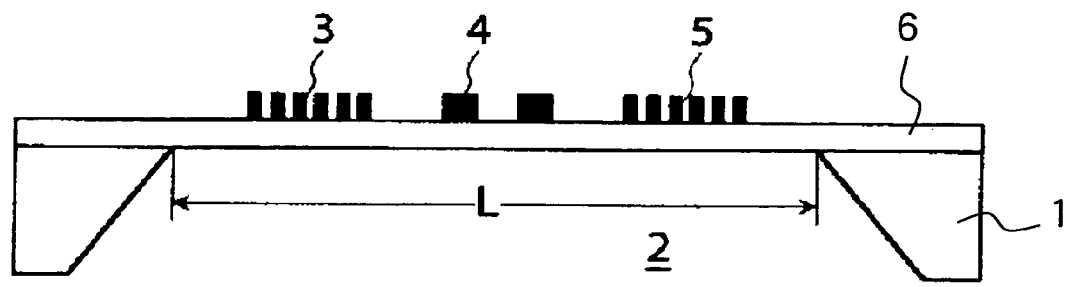
FIG. 2 is a sectional view taken along the line A—A of FIG. 1.

In FIG. 1 (top view) and FIG. 2 (sectional view) which show the first embodiment, protective film is omitted and in FIG. 2, the sectional areas are not hatched for better visibility. As shown in FIG. 1 and FIG. 2, electrical insulating film (supporting film) 6 is formed on a front side (top face) of a flat substrate 1 of silicon. The flat substrate 1 has a thermal insulating area (thermal insulator) 2 as a space (cavity) made by etching its reverse side (bottom face). The thermal insulating area 2 is defined by the bottom face of the flat substrate 1 and the electrical insulating film 6; and the space below the insulating film 6 of the thermal insulating area 2 is a cavity.

The thermal insulating area 2 is rectangular as indicated by broken lines in FIG. 1, where its sides parallel to the axis of air flow (indicated by the bold black arrow) are greater than its sides perpendicular to the axis. In other words, the flat substrate 1 has a rectangular thermal insulating area 2 whose long sides are parallel to the axis of air flow.

In the insulating film 6 of the rectangular thermal insulating area 2, a U-shaped heating resistor 4 is located almost in the center in its longitudinal direction. Made of thin polysilicon film or thin platinum film, the heating resistor 4 is heated so that the difference between its temperature and the temperature of air flow to be measured is a fixed value. At both sides (upstream and downstream of the air flow) of the heating resistor 4, resistance temperature detectors 3 and 5 are located respectively. The resistance temperature detectors 3 and 5 each take the form of a rectangle consisting of several folds of thin polysilicon film or thin platinum film.

The respective ends of the heating resistor 4 and resistance temperature detectors 3 and 5 are connected with electrode terminals 7. The electrode terminals 7 are located at one end in the direction perpendicular to the axis of the air flow, on the flat substrate 1.

In this structure, the heating resistor 4 is heated so that its temperature has a fixed difference from the air temperature. As air flows, the upstream temperature of the heating resistor 4 goes down and its downstream temperature goes up. The resistance temperature detectors 3 and 5 detect this temperature change to measure the air flow rate. This method of air flow rate measurement is well known and its detailed description is omitted here.

Figure 3:
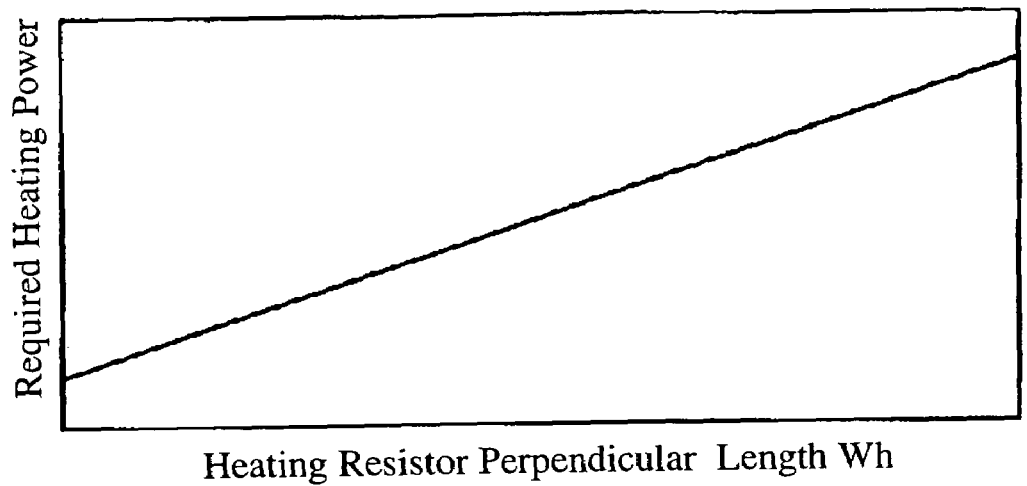
FIG. 3 is a characteristic graph concerning the present invention.

As mentioned above, in the present invention, the sides of thermal insulating area 2 which are parallel to the axis of air flow are greater than its sides perpendicular to the axis. In other words, it is oblong in the axial direction of the air flow. FIG. 3 shows the relation between the perpendicular length Wh (length perpendicular to the axis of air flow) of the heating resistor 4 and the power required for the heating resistor 4 to reach a prescribed temperature level.

As can be clearly understood from FIG. 3, as the perpendicular length Wh of the heating resistor 4 decreases, the power required for the heating resistor 4 decreases. This is because the quantity of air to be heated by the heating resistor 4, namely the quantity of air passing above the heating resistor 4, is in proportion to the perpendicular length Wh.

In the present invention, the parallel sides (long sides) of the thermal insulating area 2 with respect to the axis of air flow are greater than its perpendicular sides (short sides). Therefore, according to the present invention, the power required for the heating resistor 4 can be reduced by decreasing its perpendicular length Wh while the required capacity of the heating resistor 4 is maintained. The y-intercept of the power versus perpendicular length relation graph (FIG. 3) corresponds to heat generation in the wiring to the heating resistor 4 or heat radiation from the heating resistor 4 to the flat substrate 1.

Figure 4:
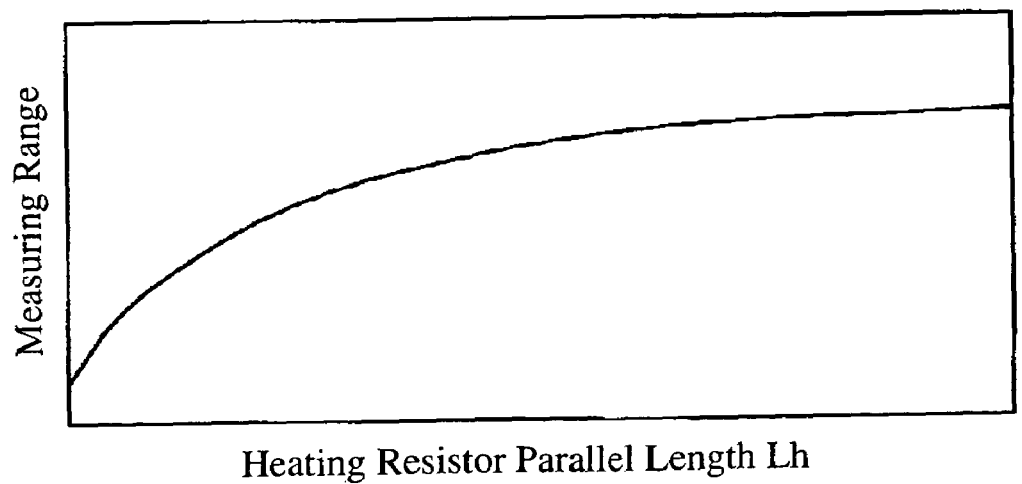
FIG. 4 is a characteristic graph concerning the present invention.

The relation between the parallel length Lh of the heating resistor 4 (parallel to the axis of air flow) and the air flow rate measuring range is shown in FIG. 4. As apparent from FIG. 4, the measuring range can be broadened by increasing the parallel length Lh of the heating resistor 4.

Limitation to the air flow rate measuring range occurs for the following reason; as the rate of the air flow to be measured increases, the air flow velocity increases and thus the time period for which the air in the air flow passes over the heating resistor 4 decreases and the air in the air flow to be measured cannot be heated to a prescribed temperature level.

This mechanism can be explained more specifically as follows. The air which passes over the heating resistor 4 is heated by the heating resistor 4 so that the temperature of the resistance temperature detector 5 on the downstream rises. If the air is not heated to the prescribed temperature level by the heating resistor 4, the temperature of the air flow falls after passing the heating resistor 4. The effect of increasing the temperature of the resistance temperature detector 5 on the downstream becomes smaller and thus the temperature difference between the resistance temperature detectors 3 and 5 which should vary according to the air flow rate becomes smaller. Consequently, with increase in the air flow rate, the output voltage might be saturated or decreased, which limits the measuring range.

As mentioned above, in the present invention, the parallel sides (long sides) of the thermal insulating area 2 with respect to the axis of air flow is greater than its perpendicular sides (short sides) and the parallel (horizontal) length of the heating resistor 4, Lh, can be increased. Hence, even when the flow velocity increases with increase in the air flow rate, the time of the air passing over the heating resistor 4 can be sufficient and thus the measuring range can be broadened.

Figure 5:
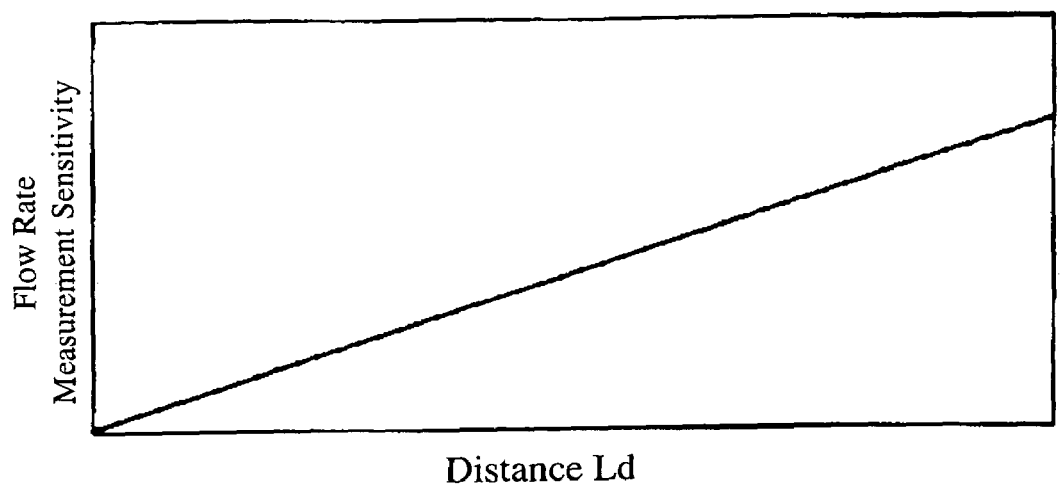
FIG. 5 is a characteristic graph concerning the present invention.

FIG. 5 shows the relation between the flow rate measurement sensitivity and distance Ld where Ld represents the distance of the heating resistor 4 to each of the short sides of the thermal insulating area 2 in the air flow axial direction. As apparent from FIG. 5, as the distance Ld increases, the flow rate measurement output (temperature difference between the resistance temperature detectors 3 and 5) increases. This is because the time of the air passing over the thermal insulating area 2 lengthens and thus the total amount of heat exchange between the thermal insulating area 2 and the air increases.

In the present invention, since the parallel sides of the thermal insulating area 2 with respect to the axis of air flow are greater than its perpendicular sides, the distance Ld between the heating resistor 4 and the perpendicular sides of the thermal insulating area 2 can be increased. Therefore, the air flow rate measurement output can be increased and thus the flow rate measurement sensitivity can be improved.

Figure 6:
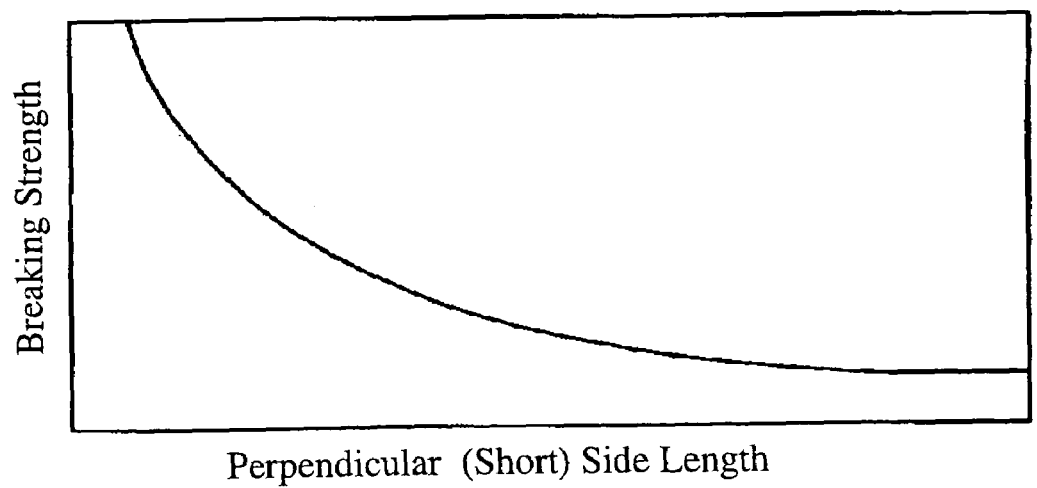
FIG. 6 is a characteristic graph concerning the present invention.

In a thermal air flowmeter in which the periphery of the insulating film 6 of the thermal insulating area 2 is fixed on the flat substrate 1, the breaking strength of the thermal insulating area (thermal insulator) 2 depends on the length W of its sides (short sides) which are perpendicular to the axis of air flow as shown in FIG. 6. As can be understood from FIG. 6, as the short side of the thermal insulating area 2 decreases, the breaking strength of the thermal insulating area 2 increases.

In the present invention, the thermal insulating area 2 is rectangular and the perpendicular side with respect to the axis of air flow is the short side of the rectangle and its length W is decreased so as to increase the breaking strength of the thermal insulating area 2.

In the present invention, since the parallel sides of the thermal insulating area 2 with respect to the axis of air flow are greater than its perpendicular sides, the distance between the heating resistor 4 and the perpendicular sides of the thermal insulating area 2 (with respect to the axis of air flow) can be increased, and thus the flow rate measurement sensitivity can be improved. In addition, the length of the heating resistor (which is perpendicular to the axis of air flow) can be decreased so as to reduce power consumption and also the width of the heating resistor (which is parallel to the axis of air flow) can be increased so as to broaden the measuring range.

Furthermore, the sides of the thermal insulating area which are perpendicular to the axis of air flow, which are the short sides of the rectangle, can be decreased so as to increase the breaking strength of the thermal insulating area.

Based on what has been described above, the inventor explored a thermal air flowmeter which saves power consumption of a heating resistor and provides a wide measuring range and a high sensitivity through a thermal insulating area with a high breaking strength.

For this purpose, the relation between an index and L/W was calculated where the index is the quotient of the product of measuring range, sensitivity, and breaking strength, divided by the electric power for heating, and L represents the parallel length (parallel side, long side) of the thermal insulating area 2 with respect to the axis of air flow and W represents its perpendicular length (perpendicular side, short side). Here it is assumed that the product of parallel length L and perpendicular length W, namely the area of the thermal insulating area 2, is constant and the parallel length (width) Lh of the heating resistor 4 and the distance Ld between the heating resistor 4 and the perpendicular sides of the thermal insulating area 2 are in proportion to the parallel length L of the thermal insulating area 2.

Figure 7:
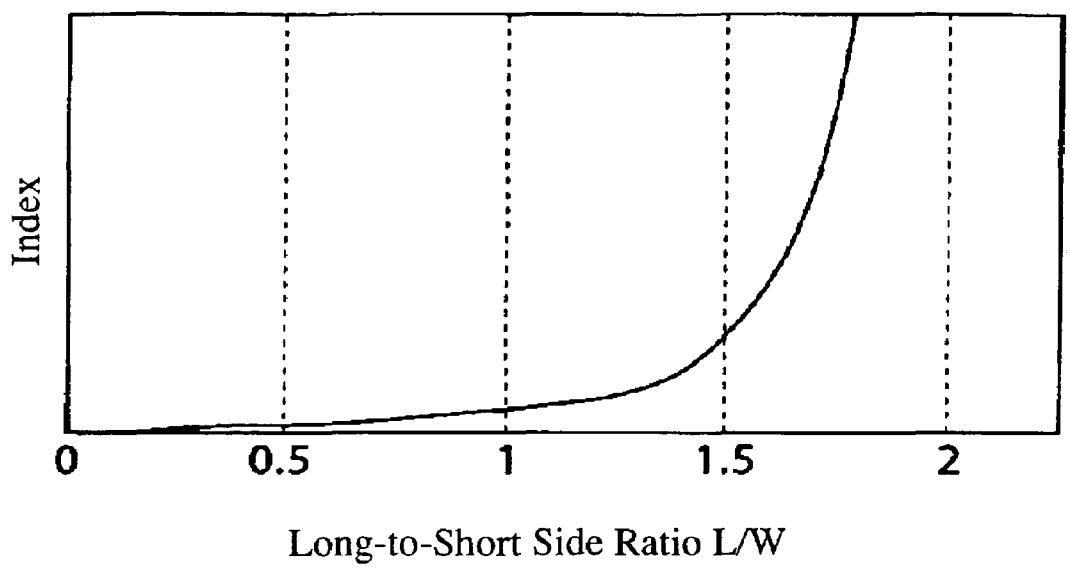
FIG. 7 is a characteristic graph concerning the present invention.

FIG. 7 shows the result of calculation based on these conditions. As indicated in FIG. 7, when the long-to-short side ratio L/W exceeds 1, the index (product of measuring range, sensitivity, and breaking strength, divided by required electric power) sharply increases. This means that the long-to-short side ratio L/W (parallel length L to perpendicular length W of the thermal insulating area 2) should be 1 or more and preferably 1.5 or more in order to obtain a thermal air flowmeter which requires less power for the heating resistor 4 and features a wide air flow rate measuring range, high sensitivity to air flow rates, and high breaking strength of the thermal insulating area 2.

What is suggested by this relation applies to Ld/W, where Ld represents the distance Ld between the heating resistor 4 and the perpendicular sides of the thermal insulating area 2 and W represents the perpendicular length of the area. When Ld/W is 1 or more, a very desirable result will be obtained.

Figure 8:
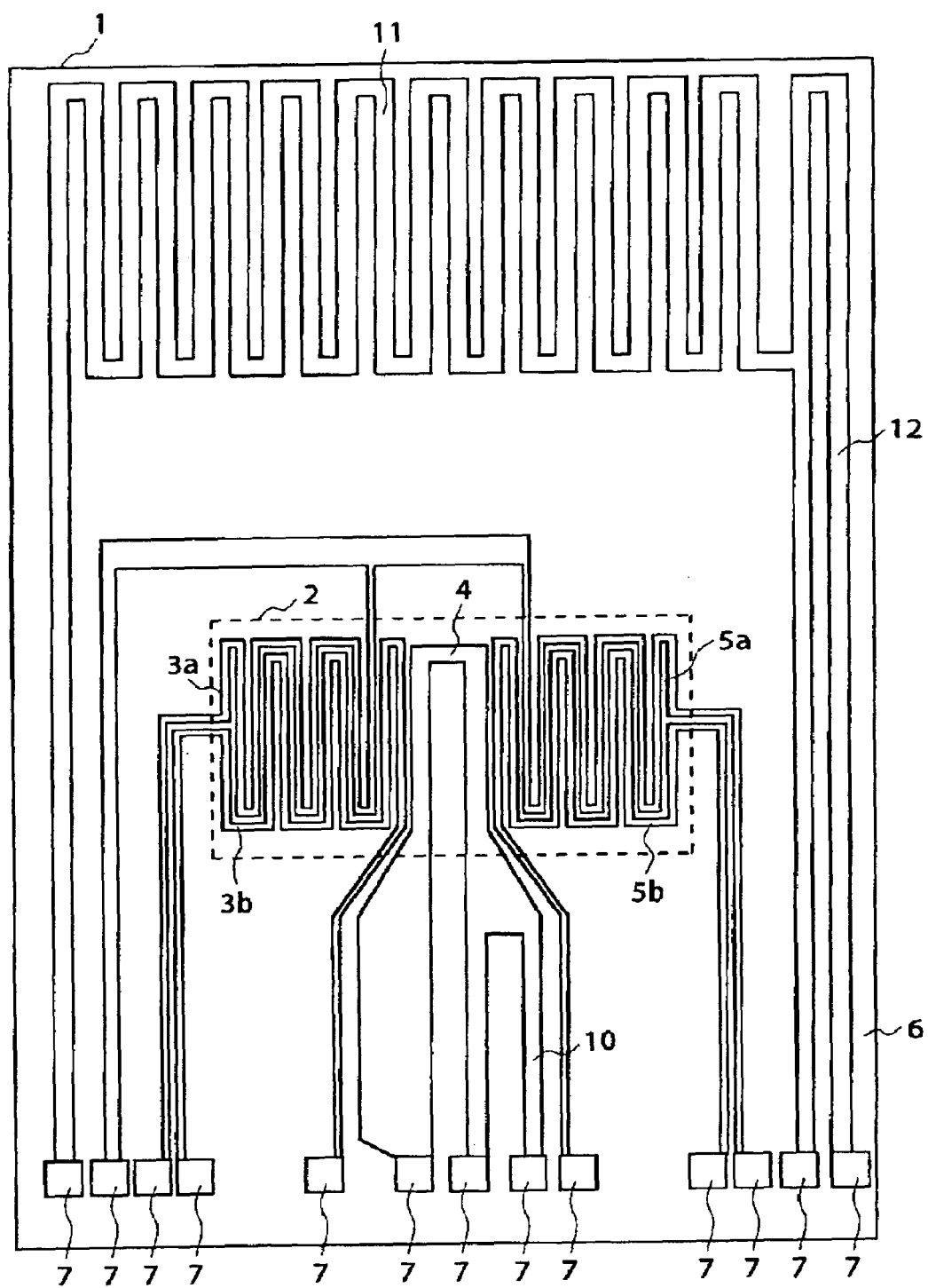
FIG. 8 is a top view showing a second embodiment of the present invention.

FIG. 8 is a top view showing a thermal air flowmeter according to the second embodiment of the present invention.

In FIG. 8, the elements designated with the same reference numerals as those shown in FIG. 1 are elements equivalent to those in FIG. 1. A pair of resistance temperature detectors 3a and 3b and a pair of resistance temperature detectors 5a and 5b are provided on both sides of the heating resistor 4 respectively. Located on the flat substrate (silicon substrate) 1 are a resistor 10 connected in series with the heating resistor 4, a resistor 11 for measuring the air temperature and a resistor 12 connected in series with the resistor 11. The resistors 11 and 12 are exposed to the air flow to be measured on the flat substrate 1 in a way that their resistance values vary depending on the air temperature of the air flow.

The heating resistor 4 and resistor 10 have the same line width so that their specific resistances do not change with patterning or etching. Likewise, the resistors 11 and 12 have the same line with so that their specific resistances do not change with patterning or etching. The heating resistor 4, resistance temperature detectors 3a, 3b, 5a, 5b and resistors 10, 11, 12 are respectively connected with electrode terminals 7 for connection with external circuitry.

In this structure, the resistance temperature detectors 3a, 3b, 5a, 5b generate heat when voltage is applied for temperature measurement. Particularly, measurement characteristics for low flow rates deteriorate when they generate heat.

In the embodiment shown in FIG. 8, in order to prevent this, the line width (thickness) of the resistance temperature detectors 3a, 3b, 5a, 5b is smaller than that of the heating resistor 4, thereby increasing their resistance.

Another approach to making the resistance of the resistance temperature detectors 3a, 3b, 5a, 5b high is that the resistance temperature detectors 3a, 3b, 5a, 5b and the heating resistor 4 are made of thin polysilicon film and the dose of the resistance temperature detectors 3a, 3b, 5a, 5b is smaller than the dose of the heating resistor 4. In this case, since the temperature coefficient of the resistance temperature detectors 3a, 3b, 5a, 5b can also be increased by decreasing the dose of the thin polysilicon film for the resistance temperature detectors 3a, 3b, 5a, 5b, the temperature sensitivity can be further improved.

Figure 9:
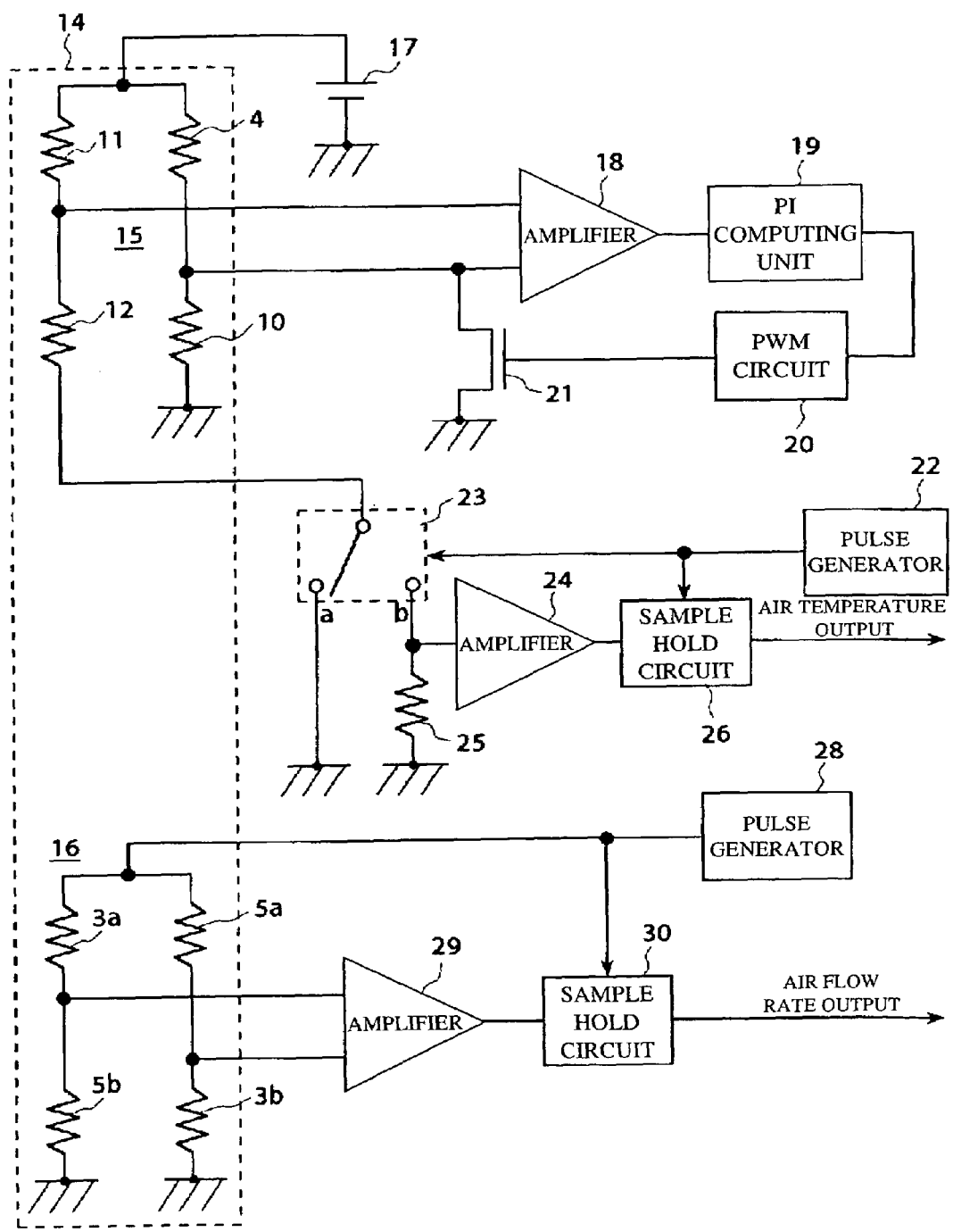
FIG. 9 shows an example of drive circuitry for the second embodiment.

An example of drive circuitry for the thermal air flowmeter shown in FIG. 8 is shown in FIG. 9.

Referring to FIG. 9, the electric circuitry of the thermal air flowmeter 14 includes a heating resistor 4, resistance temperature detectors 3a, 3b, 5a, 5b and resistors 10, 11, 12. The heating resistor 4 and resistors 10, 11, 12 constitute a bridge circuit 15 and the resistance temperature detectors 3a, 3b, 5a, 5b constitute a bridge circuit 16.

A direct-current power source 17 supplies power to the heating resistor 4 of the bridge circuit 15. An amplifier 18 detects the output voltage of the bridge circuit 15 and adds the voltage signal to a computing unit 19. The computing unit 19 performs calculation for proportional integration of the output signal from the amplifier 18 and gives the result to a PWM circuit 20. The PWM circuit 20 generates PWM signal depending on the output of the computing unit 19 to turn on or off a transistor 21. The current of the heating resistor 4 is controlled by turning on or off the transistor 21.

A pulse generator 22 generates pulse signals to switch a switching circuit 23 to position a or b. The switching circuit 23 switches what is connected with the resistors 11 and 12. The b position of the switching circuit 23 is connected with a resistor 25 with a temperature coefficient which is different from that of the resistor 11 and 12. The resistors 11, 12, and 25 constitute a half-bridge circuit.

The voltage of the half-bridge circuit which consists of the resistors 11, 12, and 25 is amplified by an amplifier 24 and sent to a sample hold circuit 26. The sample hold circuit 26 samples the output of the amplifier 24 according to pulse signals from the pulse generator 22.

Power is supplied from a pulse generator 28 to the bridge circuit 16, which consists of the resistance temperature detectors 3a, 3b, 5a, 5b. The bridge voltage of the bridge circuit 16 is amplified by an amplifier 29 and sent to a sample hold circuit 30. The sample hold circuit 30 samples the output of the amplifier 29 according to pulse signals from the pulse generator 28.

The drive circuitry of FIG. 9 is designed to measure the air flow rate through temperature control of the heating resistor 4, temperature detection of the air flow to be measured and temperature difference between the resistance temperature detectors 3a, 3b, 5a, 5b. The temperature of the heating resistor 4 is controlled as follows. The switching circuit 23 is set to the a position (closed) and the temperature of the heating resistor 4 is detected by the amplifier 18 according to the bridge voltage of the bridge circuit 15. The computing unit 19 performs proportional-integral compensation of the temperature signal of the heating resistor 4 as detected by the amplifier 18. PWM signal is obtained from the PWM circuit 20 to turn on and off the transistor 21. The current of the heating resistor 4 is controlled by turning on or off the transistor 21 so that its temperature is controlled.

Since the transistor 21 is turned on and off, its self-heating is reduced.

The air temperature of the air flow to be measured is detected as follows. The switching circuit 23 is set to the b position (closed) and the output voltage of the half-bridge circuit which consists of the resistors 11 and 12 (exposed to the air flow and located on the flat substrate 1) and the resistor 25 (which represents the reference resistance) is amplified by the amplifier 24 and sampled by the sample hold circuit 26. The air temperature is detected as the output of the sample hold circuit 26.

When the air temperature is detected using the switching circuit 23 in this way, it is unnecessary to provide a special circuit element for air temperature detection on the flat substrate 1.

The temperature difference between the resistance temperature detectors 3a, 3b, 5a, 5b is detected as follows. Pulse voltage is applied from the pulse generator 28 to the bridge circuit 16 and the bridge voltage of the bridge circuit 16 is amplified by the amplifier 29 and sampled by the sample hold circuit 30. A temperature difference, namely air flow rate, is detected as the output of the sample hold circuit 30.

Since the power source for the bridge circuit 16, which consists of the resistance temperature detectors 3a, 3b, 5a, 5b, is driven according to pulse signals in this way, self-heating of the resistance temperature detectors 3a, 3b, 5a, 5b is reduced. When direct current voltage is applied, self-heating of the resistance temperature detectors 3a, 3b, 5a, 5b is prevented from increasing the temperature of the thermal insulator (thermal insulating area) 2 by 20° C. or more and thereby largely affecting the flow rate measurement characteristics.

In the second embodiment shown in FIGS. 8 and 9, the parallel sides of the thermal insulator with respect to the axis of air flow are greater than its perpendicular sides and the same advantageous effects as in the first embodiments shown in FIGS. 1 and 2 can be achieved.

Figure 10:
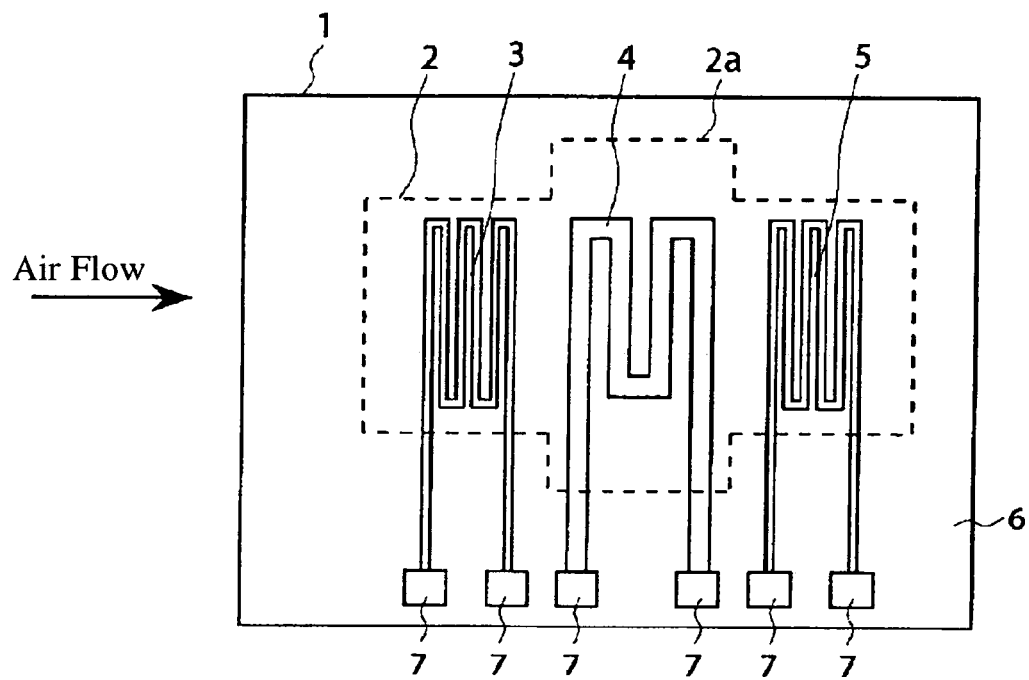
FIG. 10 is a top view showing a third embodiment of the present invention.

FIG. 10 is a top view showing the third embodiment of the present invention.

In FIG. 10, the elements designated with the same reference numerals as those in FIG. 1 are equivalent to those in FIG. 1. This embodiment is different from the first embodiment (FIG. 1) in that part 2a of the thermal insulating area 2 where the heating resistor 4 lies is enlarged in the direction perpendicular to the axis of air flow (top-bottom direction in the figure). In other words, the thermal insulating area 2 is cruciform.

In the third embodiment shown in FIG. 10, the amount of heat which is transferred from the heating resistor 4 to the flat substrate 1 perpendicularly to the axis of air flow can be decreased. Also, since the thermal insulator (thermal insulating area) 2 is cruciform, the perpendicular side (short side) may be small, which means that heat radiation from the heating resistor 4 to the flat substrate 1 can be reduced without deterioration in the strength of the thermal insulator 2. Even when the thermal insulator 2 is not cruciform but T-shaped, the same advantageous effect can be achieved.

Again, in the third embodiment shown in FIG. 10, the parallel sides of the thermal insulator with respect to the axis of air flow are greater than its perpendicular sides and the same advantageous effects as in the first embodiments shown in FIGS. 1 and 2 can be achieved.

Figure 11:
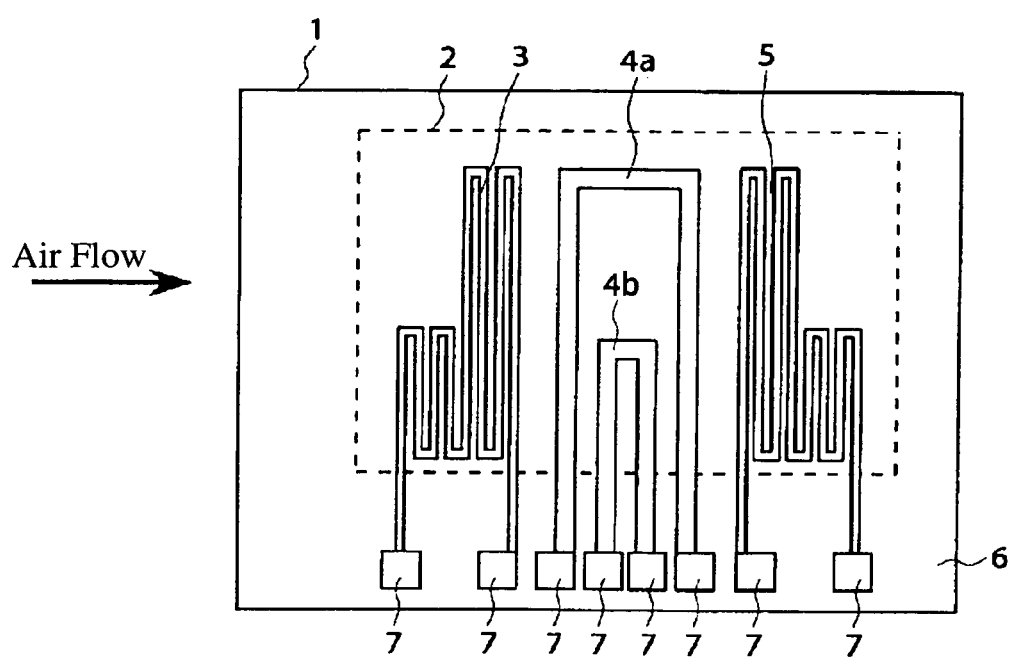
FIG. 11 is a top view showing a fourth embodiment of the present invention.

FIG. 11 is a top view showing the fourth embodiment of the present invention.

In FIG. 11, the elements designated with the same reference numerals as those in FIG. 1 are equivalent to those in FIG. 1. This embodiment is mainly different from the embodiment in FIG. 1 in that it has two heating resistors 4a and 4b which are different in the length perpendicular to the axis of air flow. Also, each of the resistance temperature detectors 3 and 5 consists of shorter and longer portions in the direction perpendicular to the axis of air flow. The length of the longer portions is almost equal to the length of the heating element 4a and the length of the longer portions is almost equal to the length of the heating resistor 4b.

FIGS. 12A, 12B, and 12C show an example of drive circuitry for the thermal air flowmeter shown in FIG. 11.

As shown in FIG. 12A, the heating resistor 4b (shorter resistor) and resistors 32 to 34 constitute a bridge circuit 31. The bridge voltage of the bridge circuit 31 is amplified by an amplifier 35 and supplied to the bridge circuit 31 as supply voltage.

As shown in FIG. 12B, the heating resistor 4a (longer resistor) and resistors 37 to 39 constitute a bridge circuit 36. The bridge voltage of the bridge circuit 36 is amplified by an amplifier 40 and supplied through a limiting circuit 41 to the bridge circuit 36 as supply voltage.

As shown in FIG. 12C, the resistance temperature detectors 3 and 5 and resistors 43 and 44 constitute a bridge circuit 42. Power is supplied from a direct current power source 45 to the bridge circuit 42. The bridge voltage of the bridge circuit 42 is amplified by an amplifier 46 and outputted as air flow rate measurement data.

Figure 12:
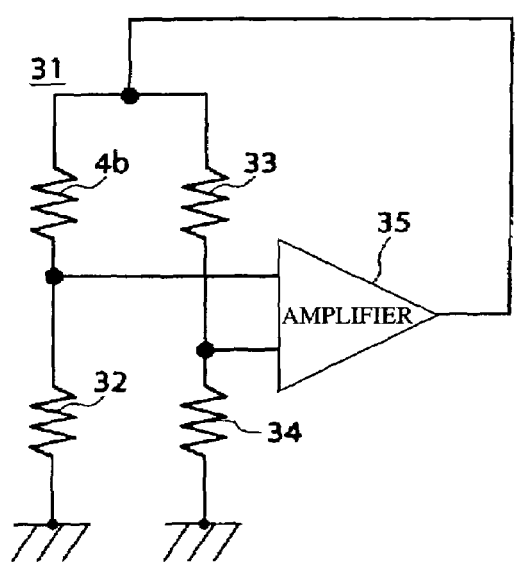
FIG. 12A, FIG. 12B and FIG. 12C show an example of drive circuitry for the fourth embodiment.
Figure 12:
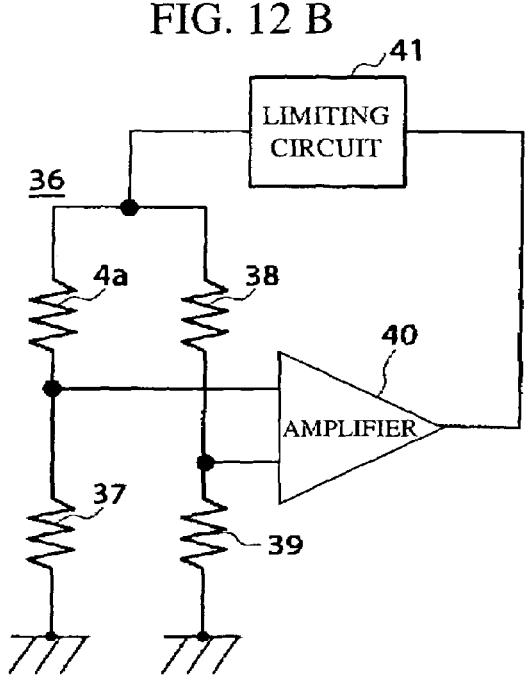
Figure 12:
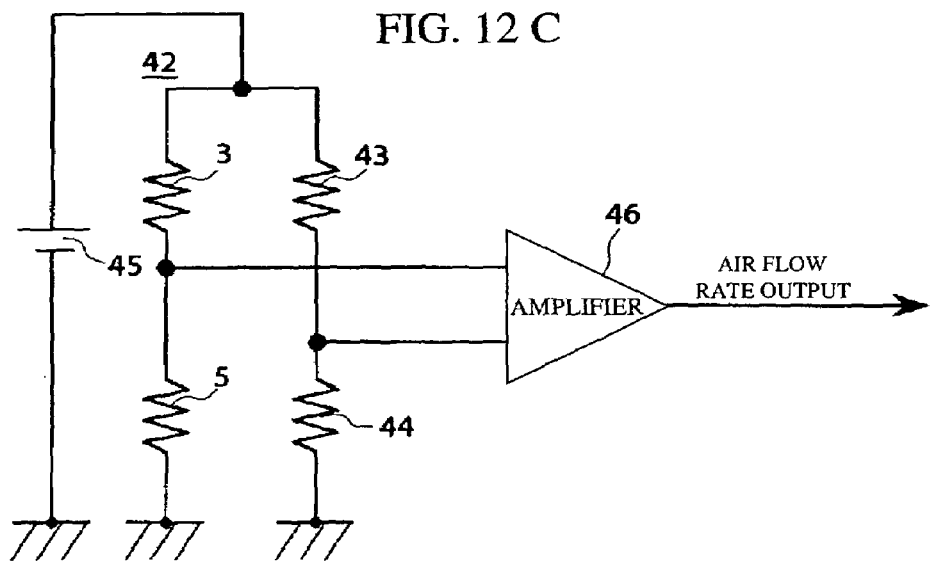
Figure 13:
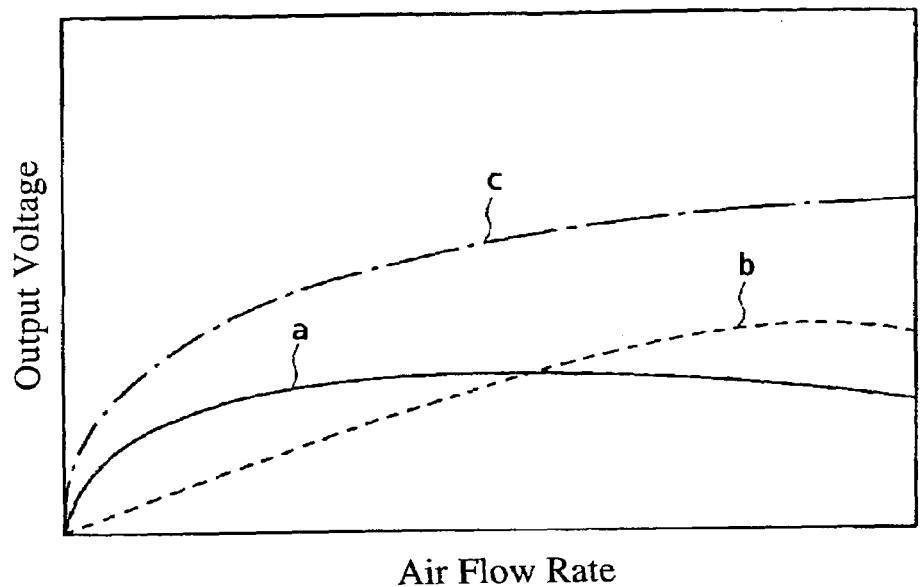
FIG. 13 is a characteristic graph concerning the fourth embodiment.

Referring to FIG. 13, an explanation is given below of the operational characteristics of the thermal air flowmeter according to the fourth embodiment (FIG. 111) which is driven by the drive circuitry shown in FIG. 12.

When only the heating resistor 4a (which is longer in the direction perpendicular to the axis of air flow) shown in FIG. 12B is operated, the sensitivity (output voltage) becomes high on the low flow rate side and saturated on the high flow rate side as indicated by characteristic curve "a" in FIG. 13. This is because the heating resistor 4a is perpendicularly long and therefore on the low flow rate side, the influence on the resistance temperature detectors 3 and 5 (which is located on both sides of it) is large. On the other hand, on the high flow rate side, due to the presence of the limiting circuit 42, the temperature of the heating resistor 4a decreases and the output voltage becomes saturated.

When only the heating resistor 4b (which is shorter in the direction perpendicular to the axis of air flow) shown in FIG. 12A is operated, the sensitivity is low on the low flow rate side but the measuring range (flow rate measuring voltage range) is broader as indicated by characteristic curve "b" in FIG. 13. When the heating resistors 4a and 4b are operated simultaneously, the sensitivity is high on the low flow rate side while the output voltage is not saturated on the high flow rate side, as indicated by characteristic curve "c" in FIG. 13.

When a thermal air flowmeter provides high sensitivity for low flow rates and low sensitivity but a broader measuring rage for high flow rates in this way, it is most suitable as a thermal air flow meter intended to measure an intake air flow rate in an engine.

Figure 14:
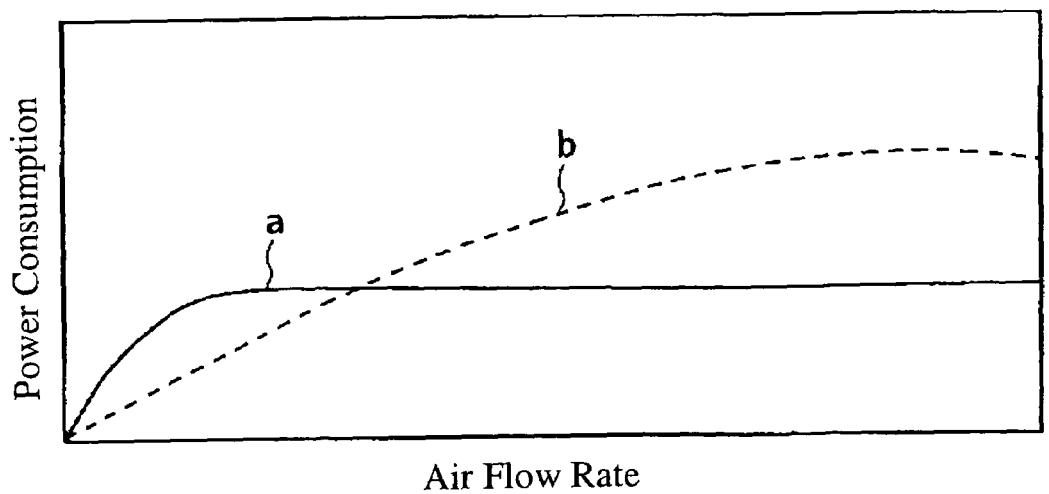
FIG. 14 is a characteristic graph concerning the fourth embodiment.

Regarding power consumption, when only the heating resistor 4b is operated, the relation between power consumption and air flow rates is as indicated by characteristic curve "b" in FIG. 14; and when only the heating resistor 4a is operated, it is as indicated by characteristic curve "a". When only the heating resistor 4a is operated, the output voltage is limited by the limiting circuit 41 and thus power consumption of the heating resistor 4a is reduced on the high flow rate side. Again, in the fourth embodiment shown in FIG. 11, since the sides of the thermal insulating area which are parallel to the axis of air flow are greater than its perpendicular sides, the same advantageous effects as in the first embodiment shown in FIGS. 1 and 2 can be achieved.

Figure 15:
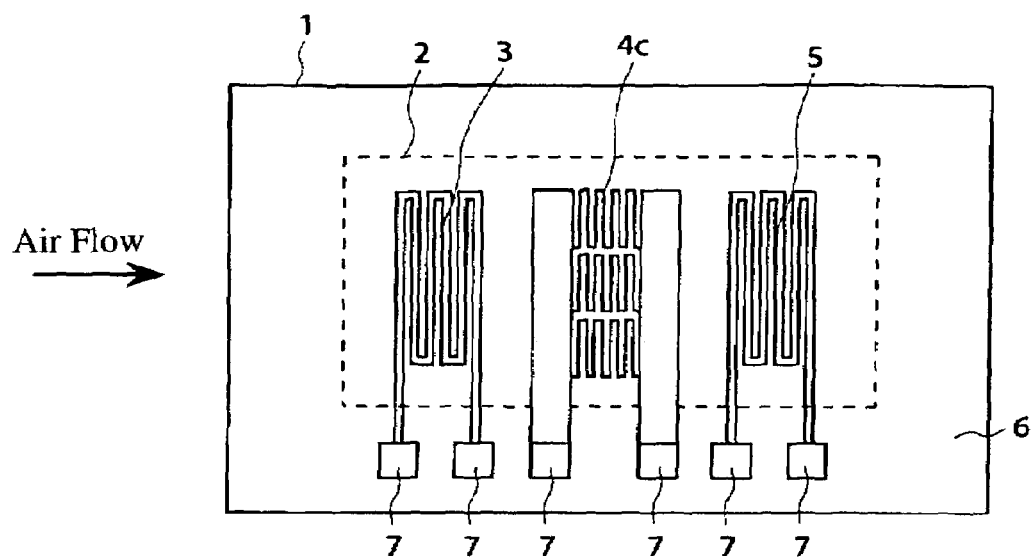
FIG. 15 is a top view showing a fifth embodiment of the present invention.

FIG. 15 is a top view showing the fifth embodiment of the present invention.

In FIG. 15, the elements designated with the same reference numerals as those in FIG. 1 are equivalent to those in FIG. 1. This embodiment is different from the embodiment in FIG. 1 in that the heating resistor 4c consists of three resistors which are connected in parallel.

In the heating resistor 4 used in the first embodiment (FIG. 1), temperature unevenness may occur in the direction perpendicular to the axis of air flow, namely the temperature may be high in the center and low in the peripheral area. In the embodiment shown in FIG. 15, since the constituent resistors of the heating resistor 4c are arranged in parallel, if the temperature of the peripheral area goes down, the resistance of the peripheral area declines and thus the current flowing through the peripheral area increases. Thus, the temperature of the peripheral area goes up and significant temperature unevenness is less likely to occur in the heating resistor 4c in the direction perpendicular to the axis of air flow.

Thus, the peak temperature of the heating resistor 4c can be decreased by reducing the possibility of occurrence of temperature unevenness in the direction perpendicular to the axis of air flow. The heating resistor 4c is made of platinum or polysilicon. As the peak temperature rises, change over time occurs more easily and the resistance value changes. In the embodiment shown in FIG. 15, since the constituent resistors of the heating resistor 4c are arranged in parallel, the temperature unevenness is smaller and the peak temperature is lower.

Again, in the fifth embodiment shown in FIG. 15, since the sides of the thermal insulating area which are parallel to the axis of air flow are greater than its perpendicular sides, the same advantageous effects as in the first embodiment shown in FIGS. 1 and 2 can be achieved.

Figure 16:
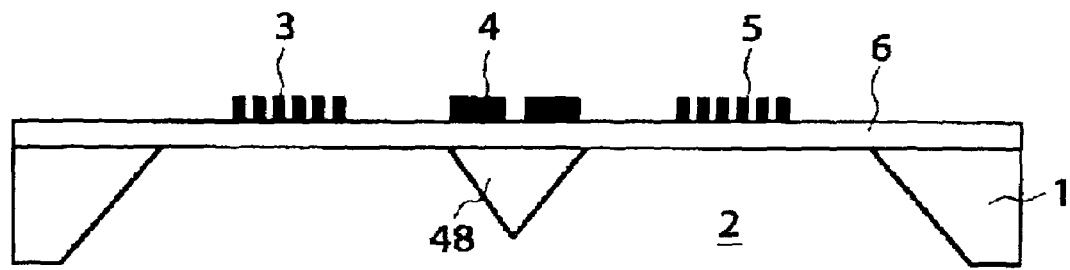
FIG. 16 is a sectional view showing a sixth embodiment of the present invention.

FIG. 16 is a sectional view showing a thermal air flowmeter according to the sixth embodiment of the present invention. In the figure, the sectional areas are not hatched for better visibility.

The elements designated with the same reference numerals as those in FIG. 1 are equivalent to those in FIG. 1. This embodiment is different from the first embodiment in FIG. 1 in that it has a silicon member with a triangular cross section 48 underneath the heating resistor 4.

This silicon member 48 increases the thermal conductivity of the heating resistor 4 and reduces temperature unevenness in the direction perpendicular to the axis of air flow.

Again, in the sixth embodiment shown in FIG. 16, since the sides of the thermal insulating area which are parallel to the axis of air flow are greater than its perpendicular sides, the same advantageous effects as in the first embodiment shown in FIGS. 1 and 2 can be achieved.

Figure 17:
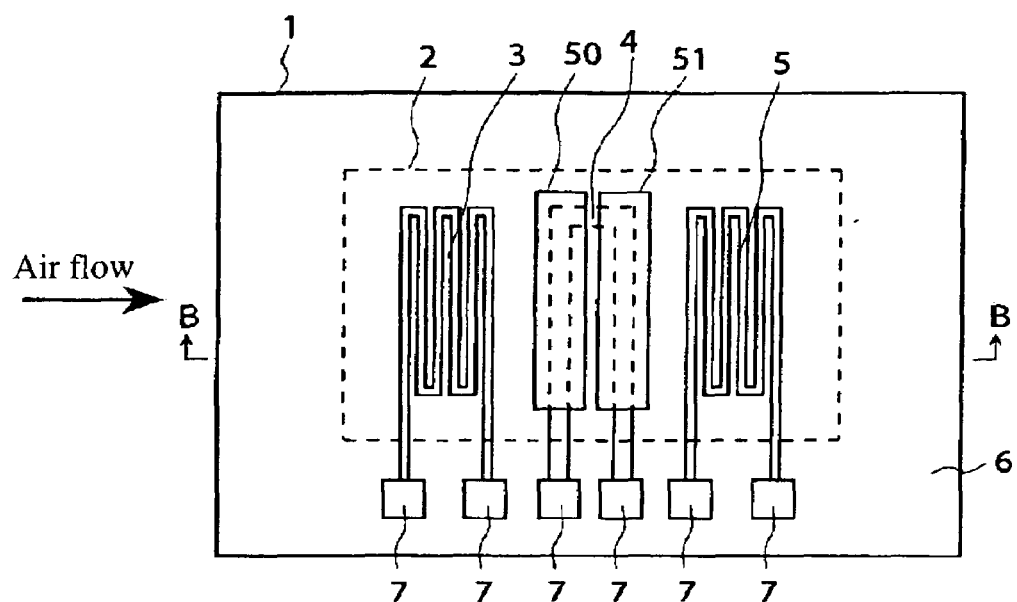
FIG. 17 is a top view showing a seventh embodiment of the present invention.
Figure 18:
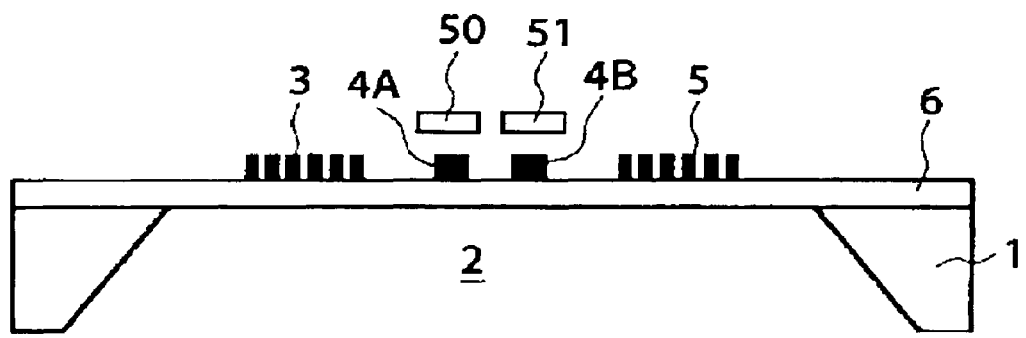
FIG. 18 is a sectional view taken along the line B—B of FIG. 17.

FIGS. 17 and 18 show the seventh embodiment of the present invention where FIG. 17 is a top view and FIG. 18 is a sectional view taken along the line B—B of FIG. 17. In these figures, protective film is omitted and in FIG. 8, the sectional areas are not hatched for better visibility.

In FIGS. 17 and 18, the elements designated with the same reference numerals as those in FIGS. 1 and 2 are equivalent to those in FIGS. 1 and 2. This embodiment is different from the first embodiment in FIG. 1 in that aluminum plates 50 and 51 are above the upstream side 4A and downstream side 4B of a U-shaped heating resistor 4, respectively.

When the aluminum plates 50 and 51 are located above the heating resistor 4 in this way, the thermal conductivity of the heating resistor 4 in the direction perpendicular to the axis of air flow is increased and temperature unevenness in the perpendicular direction is reduced. In addition, since the aluminum plate 50 for the upstream side 4A of the U-shaped heating resistor 4 and the aluminum plate 51 for its downstream side 4B are separate from each other, the difference between the upstream and downstream sides of the heating resistor 4 changes according to change in the air flow rate more largely and more easily.

Again, in the seventh embodiment shown in FIGS. 17 and 18, since the sides of the thermal insulating area which are parallel to the axis of air flow are greater than its perpendicular sides, the same advantageous effects as in the first embodiment shown in FIGS. 1 and 2 can be achieved.

Figure 19:
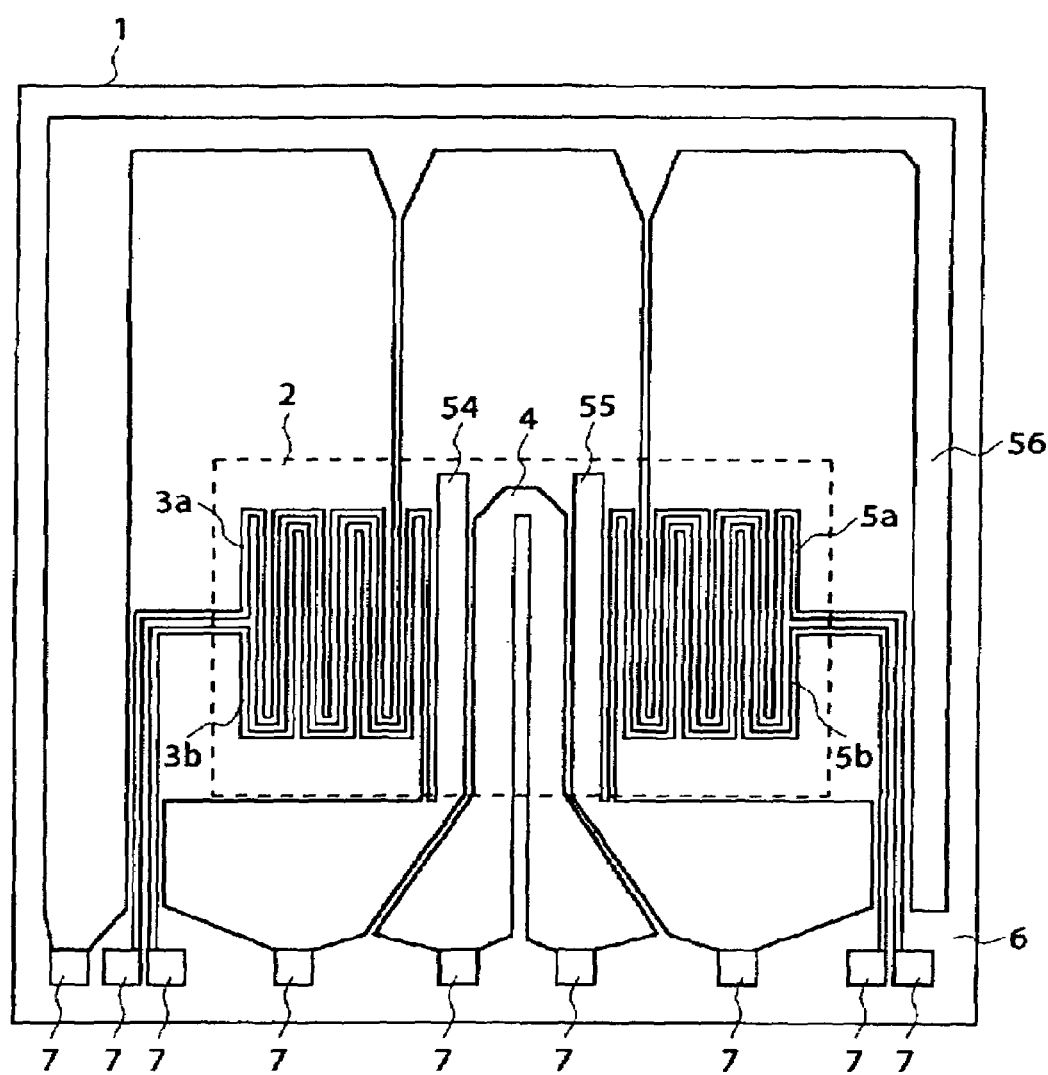
FIG. 19 is a top view showing an eighth embodiment of the present invention.

FIG. 19 is a top view showing the eighth embodiment of the present invention.

The elements designated with the same reference numerals as those in FIGS. 1 and 8 are equivalent to those in FIGS. 1 and 8. In this embodiment, a pair of resistance temperature detectors 3a and 3b and a pair of resistance temperature detectors 5a and 5b are provided on both sides of the heating resistor 4 respectively. A shield plate (shield pattern) 54 is provided between the heating resistor 4 and the resistance temperature detectors 3a and 3b and shield plates (shield patterns) 55 and 56 are provided around the resistance temperature detectors 5a and 5b.

In the eighth embodiment shown in FIG. 19, the shield plates 54 and 55 are located between the heating resistor 4 and resistance temperature detectors 3a and 3b and between the heating resistor 4 and resistance temperature detectors 5a and 5b respectively and the shield plate 56 is located downstream of the resistance temperature detectors 5a and 5b.

When the heating resistor 4 is driven according to pulse signals, this structure reduces the levels of spike noise voltage which appears at both ends of the resistance temperature detectors 3a, 3b, 5a, and 5b due to electrostatic coupling of the heating resistor 4 and resistance temperature detectors 3a, 3b, 5a, and 5b. Again, in the eighth embodiment shown in FIG. 19, since the sides of the thermal insulating area which are parallel to the axis of air flow are greater than its perpendicular sides, the same advantageous effects as in the first embodiment shown in FIGS. 1 and 2 can be achieved.

Figure 20:
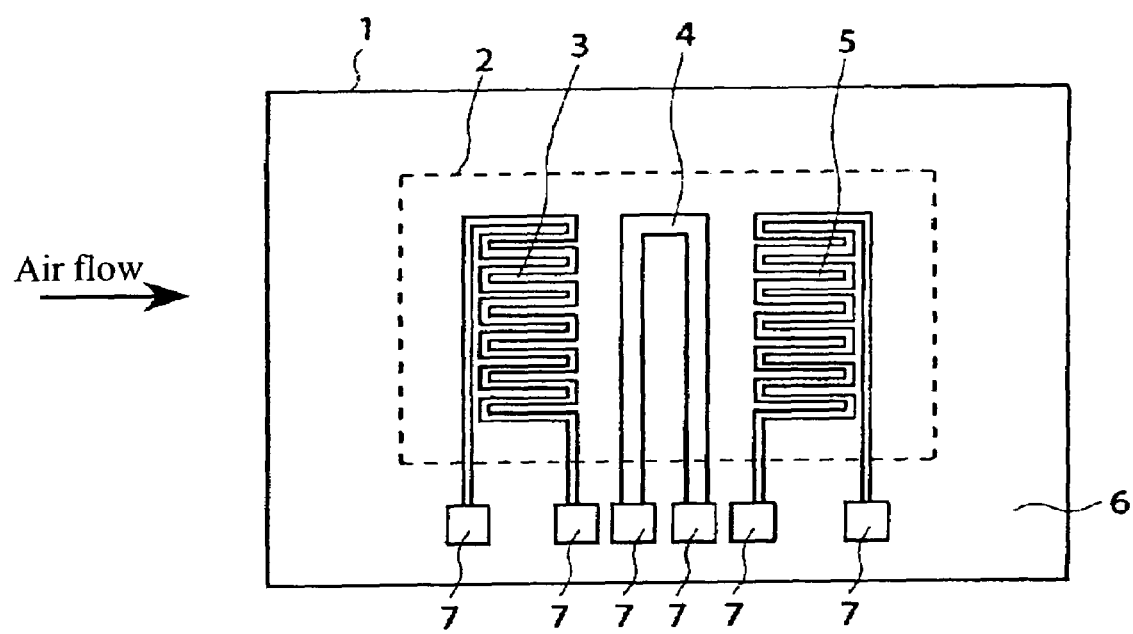
FIG. 20 is a top view showing a ninth embodiment of the present invention.

FIG. 20 is a top view showing an air flowmeter according to the ninth embodiment of the present invention.

The elements designated with the same reference numerals as those in FIG. 1 are equivalent to those in FIG. 1. This embodiment is different from the first embodiment in FIG. 1 in that resistance temperature detectors 3 and 5 are folded in a way that the total length of the sides parallel to the axis of air flow is increased.

The resistance temperature detectors 3 and 5 are made of thin polysilicon or platinum film. Their thickness is about 1 μm. This thickness slightly affects the air flow passing over the surface of the thermal insulator 2 and changes the air flow from a laminar flow into an eddy flow.

In the ninth embodiment shown in FIG. 20, the resistance pattern of the resistance temperature detectors 3 and 5 is formed so that the total length of the sides parallel to the axis of air flow is increased and thus the influence of the thickness of the resistance temperature detectors 3 and 5 can be reduced.

Again, in the ninth embodiment shown in FIG. 20, since the sides of the thermal insulating area 2 which are parallel to the axis of air flow are greater than its perpendicular sides, the same advantageous effects as in the first embodiment shown in FIGS. 1 and 2 can be achieved.

As discussed above, according to the present invention, the thermal insulating area is rectangular where its sides parallel to the axis of air flow are greater than its perpendicular sides; therefore the distance between the heating element and the sides of the thermal insulating area which are perpendicular to the axis of air flow can be increased so as to improve the flow rate measurement sensitivity. In addition, the length of the heating resistor, which is perpendicular to the axis of air flow, can be decreased so as to reduce power consumption and also the width of the heating element, which is parallel to the axis of air flow, can be increased so as to broaden the measuring range.

In the above embodiments, the sides of the thermal insulating area which are perpendicular to the axis of air flow, which are the short sides of the rectangle, are shortened so as to increase the breaking strength of the thermal insulating area.

The technical ideas (inventions) which are not set forth in the appended claims but can be derived from the above embodiments are as follows.

Invention 1:
A thermal air flowmeter which has two types of heating resistors, wherein the perpendicular length of a first type heating resistor with respect to the axis of air flow is long and the perpendicular length of a second type heating resistor with respect to the axis of air flow is shorter than that of the first type heating resistor.

Invention 2:
A thermal air flowmeter, wherein heating resistors are arranged in parallel.

Invention 3:
A thermal air flowmeter, wherein thermally conductive material is located opposite to a heating resistor.

Invention 4:
A thermal air flowmeter, wherein a thermally conductive body is divided in the direction of air flow.

Invention 5:
A thermal air flowmeter, wherein a wiring pattern maintained at a given voltage is provided around a resistance temperature detector or a resistance temperature detector lead wire.

Invention 6:
A thermal air flowmeter, wherein a resistance temperature detector is a temperature-dependent resistor and located parallel to the axis of air flow.

Invention 7:
A thermal air flowmeter, wherein voltage applied to a resistance temperature detector is pulsed.

Invention 8:
A thermal air flowmeter, wherein a heating resistor and a resistance temperature detector are made of polysilicon film and the resistivity of the heating resistor polysilicon film is lower than the resistivity of the resistance temperature detector polysilicon film.

Invention 9:
A thermal air flowmeter, wherein a heating resistor and a resistance temperature detector are made of polysilicon film and the heating resistor polysilicon film is thicker than the resistance temperature detector polysilicon film.

What is claimed is:

1. A thermal air flowmeter, comprising:
a flat substrate constructed of a heat conducting material, on the surface of which an insulating film is disposed and a rectangular thermal insulating area is provided as a rectangular space;
a heating element formed on said insulating film in said thermal insulating area; and
two temperature detectors formed on both sides of said heating element on said insulating film in said thermal insulating area along the direction of air flow,
wherein said thermal insulating area in said rectangular space is formed by etching said substrate, on the surface of which said insulating film is disposed, such that the length of the sides of said thermal insulating area parallel to the axis of air flow is greater than the length of the sides of said thermal insulating area perpendicular to the axis of air flow,
wherein in the thermal insulating area, the area of the heating element is larger than the area of one of the temperature detectors.

2. The thermal air flowmeter according to claim 1, wherein the length of the sides of the thermal insulating area which are parallel to the axis of air flow are at least 1.5 times longer than the length of the sides which are perpendicular to the axis of air flowthereof.

3. The thermal air flowmeter according to claim 1, wherein, regarding the thermal insulating area, with respect to the axis of air flow, the length between the ends of the heating element and the perpendicular sides is greater than the length of the perpendicular sides.

4. A thermal air flowmeter, comprising:
a semiconductor substrate constructed of a heat conducting material and on the surface of which an insulating film is disposed and a rectangular thermal insulating area is provided as a rectangular space;
a heating resistor formed on said insulating film in said thermal insulating area; and
two resistance temperature detectors formed upstream and downstream of said heating resistor on said insulating film in said thermal insulating area along the direction of air flow,
wherein said thermal insulating area in said rectangular space is formed by etching said substrate, on the surface of which said insulating film is disposed, such that the length of the sides of said thermal insulating area parallel to the axis of air flow is greater than the length of the sides of said thermal insulating area perpendicular to the axis of air flow, wherein in the thermal insulating area, the area of the heating resistor is larger than the area of one of the resistance temperature detectors.

5. The thermal air flowmeter according to claim 4, wherein the length of the sides of the thermal insulating area which are parallel to the axis of air flow are at least 1.5 times longer than the length of the sides which are perpendicular to the axis of air flow.

6. The thermal air flowmeter according to claim 4, wherein, regarding the thermal insulating area, with respect to the axis of air flow, the length between the ends of the heating resistor and the perpendicular sides is greater than the length of the perpendicular sides.

7. A thermal air flowmeter, comprising:
- a silicon substrate, on the surface of which an insulating film is disposed and a rectangular thermal insulating area is provided as a rectangular space;
- a heating resistor formed on said insulating film in said thermal insulating area; and
- two resistance temperature detectors formed upstream and downstream of said heating resistor on said insulating film in said thermal insulating area, wherein said thermal insulating area in said rectangular space is formed by etching said substrate, on the surface of which said insulating film is disposed, such that said thermal insulating area is rectangular in shape along the direction of the axis of air flow, wherein in the thermal insulating area, the area of the heating resistor is larger than the area of one of the resistance temperature detectors.

8. The thermal air flowmeter according to claim 7, wherein the length of the sides of the thermal insulating area which are parallel to the axis of air flow are at least 1.5 times longer than the length of the sides which are perpendicular to the axis of air flow.

9. The thermal air flowmeter according to claim 7, wherein, regarding the thermal insulating area, with respect to the axis of air flow, the length between the ends of the heating resistor and the perpendicular sides is greater than the length of the perpendicular sides.

* * * * *